E. H. CAUVEL.
TROLLEY GUIDE.
APPLICATION FILED MAY 20, 1913.
1,104,104.
Patented July 21, 1914.
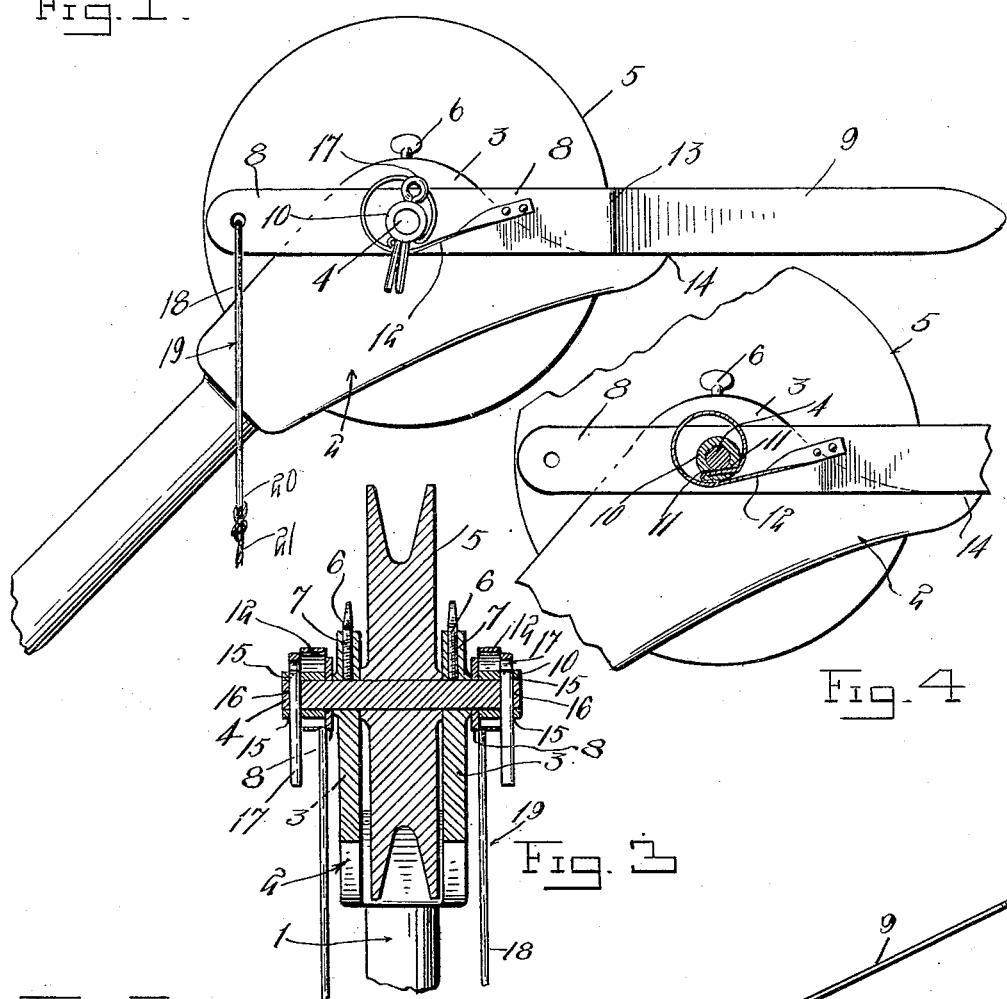
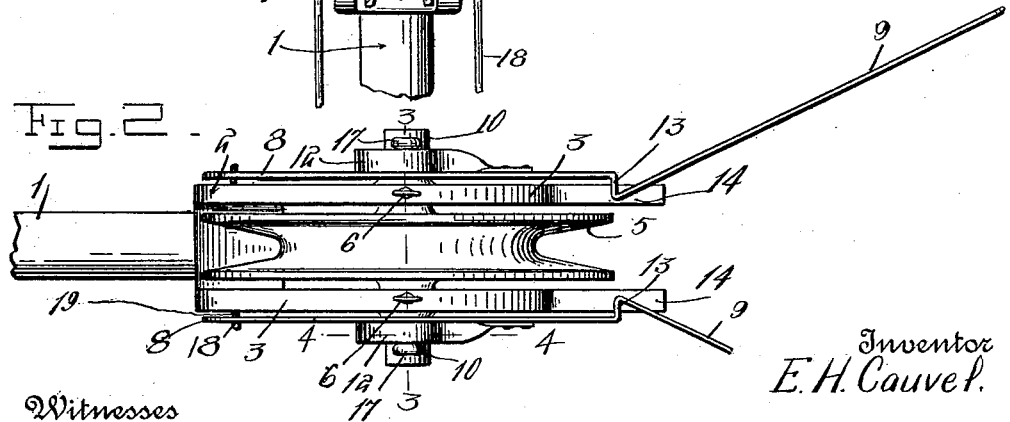
Witnesses
Inventor
E. H. Cauvel.
By
Attorneys

UNITED STATES PATENT OFFICE.

EDWARD H. CAUVEL, OF OIL CITY, PENNSYLVANIA.

TROLLEY-GUIDE.

1,104,104. Specification of Letters Patent. Patented July 21, 1914.

Application filed May 20, 1913. Serial No. 768,850.

*To all whom it may concern:*

Be it known that I, EDWARD H. CAUVEL, a citizen of the United States, residing at Oil City, in the county of Venango, State of Pennsylvania, have invented certain new and useful Improvements in Trolley-Guides; and I do hereby declare the following to be a full, clear, and exact description of the invention, such as will enable others skilled in the art to which it appertains to make and use the same.

This invention is directed to improvements in guides or finders for trolley wires, and has for its object to so construct a device of this character that the usual trolley wheel can be easily and quickly guided to the trolley wire by the conductor.

A further object of the invention is to provide a device of this character so constructed that should the trolley wheel leave the wire the conductor can readily guide the same back to the trolley wire.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a top plan view. Fig. 3 is a sectional view on line 3—3 of Fig. 2. Fig. 4 is a similar view on line 4—4 of Fig. 2.

Referring to the drawing, the numeral 1 designates the trolley pole and 2 the harp, which consists of the spaced plates 3 in which are secured the opposite ends of the axle 4, and upon which is revolubly mounted the trolley wheel 5, the same being of the usual construction.

To secure the ends of the axle 4, set screws 6 are provided, and are passed through the threaded bores 7 formed in the plates 3 so that their inner ends bear against the axle. The ends of the axle 4 extend slightly beyond the outer sides of the plates 2 and have pivotally connected thereto the fingers 8, the rear ends of which are inclined outwardly, as at 9, so as to guide the trolley wire to the wheel 5 when the pole is moved upwardly and the fingers are in vertical positions.

Mounted upon the extended ends of the axle 4 are sleeves 10, the inner ends of which are provided with spaced slots 11, and in which are secured one of the ends of the leaf springs 12, the other ends of which are connected in any suitable manner to the fingers 8, said springs serving to normally hold the fingers in horizontal positions with their off-sets 13 resting upon the shoulders 14 formed upon the plates 2.

The sleeves 10 are provided with registered perforations 15, which are adapted to register with perforations 16 formed in the axle 4, upon said sleeve partially rotating cotter pins 17, being passed through the registered perforations 15 and 16, thereby winding the springs 12 so that the tension thereof will be sufficient to hold the fingers in horizontal positions.

To the forward ends of the fingers 8 are pivotally connected the arms 18 of the yoke 19, the bight of which is provided with an eye 20 to which is connected the trolley cord 21.

From this construction it will be seen that when the trolley pole 1 moves upwardly under the action of the usual springs that the fingers 8 will be swung vertically during the time the conductor holds the cord 21, and until the trolley wire is guided to the trolley wheel, after which the cord is released and the springs 12 act to return the fingers to their normal positions.

What is claimed is:—

The combination with a trolley harp comprising spaced plates having an axle with its ends fixed in the plates and extending slightly beyond the same, said axle having its ends formed with perforations, of fingers pivotally connected to the extended ends of said axle, sleeves mounted upon the extended ends of the axle, said sleeves having slots formed therein, leaf springs each having one of its ends engaged in one of said slots of the sleeve and its other end fixed to one of the fingers, cotter pins passing through the perforations of the sleeves and axle to hold the springs in their wound position.

In testimony whereof, I affix my signature, in the presence of two witnesses.

EDWARD H. CAUVEL.

Witnesses:
DANIEL H. McCREADY,
ANTHONY J. PITROFF.

Copies of this patent may be obtained for five cents each, by addressing the "Commissioner of Patents, Washington, D. C."